3,139,414
METHOD OF PREVENTING DISCOLORATION OF OLEFIN POLYMERS BY CATALYST RESIDUES, AND THE RESULTING POLYMERIC COMPOSITION

Franco Ranalli, Milan, Italy, assignor to Montecatini Società Generale per l'Industria Mineraria e Chimica, Milan, Italy
No Drawing. Filed Dec. 5, 1957, Ser. No. 700,741
Claims priority, application Italy Dec. 10, 1956
6 Claims. (Cl. 260—45.5)

This invention relates to methods of handling polymeric olefines. More particularly, the invention relates to methods for preventing darkening of the polymers when they are exposed to elevated temperatures during working thereof.

It has been disclosed by Natta et al. (e.g., in two papers entitled, respectively, "A New Class of Alpha-Olefin Polymers Having Exceptional Uniformity of Structure" and "The Crystalline Structure of a New Type of Polypropylene," which were published in the Proceedings of The Accademia dei Lincei on January 29, 1955) that olefinic-hydrocarbons $CH_2=CHR$ in which R is a hydrocarbon radical, such as propylene, butene-1, styrene, etc. can be polymerized to entirely new polymers having different steric structures which Natta has termed "isotactic" and "atactic" respectively, with the aid of catalysts prepared from halides of transition metals of Groups IV to VI of the Periodic Table (Mendeleeff), e.g., titanium chlorides and organometallic compounds of metals of Groups I to III of the Table, e.g., triethyl aluminum. The polymerizates usually comprise a mixture of atactic, partially isotactic, and highly isotactic polymers, and as Natta et al. have shown these different types of polymers can be separated on the basis of their different steric structures by means of selective solvents. Isotactic polymers as defined by Natta et al. are made up of isotactic macromolecules, i.e., macromolecules which, at least for long sections of the main chain, or for substantially the main chain, have the kind of structure shown in the model below:

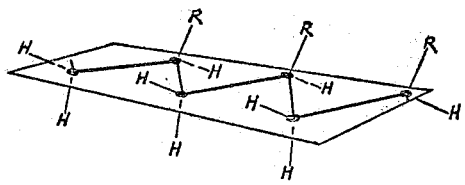

(Model of a portion of the main chain of an isotactic poly-alpha-olefin macromolecule according to Natta et al., arbitrarily fully extended in a plane, in which R substituents on the tertiary carbon atoms of adjacent monomeric units are all above and their H atoms below the plane of the chain.)

Ethylene can also be polymerized to high molecular weight polymers by means of the said catalysts.

The processes involving the use of these catalysts are important because it is possible to operate under low pressures and at relatively low temperatures. However, when the polymerization is completed, the residual catalyst remains mixed with the polymer. It is difficult, in general, to remove all of the residual catalyst and even after the usual purification the polymer usually still yields a certain amount of ashes deriving from catalyst traces which remain trapped in the polymer.

When the polymeric olefinic-hydrocarbons produced with the aid of these catalysts are made into shaped articles or otherwise used under conditions involving fusion of the polymer under heating, for example when the polymers are extruded, injection molded, or the like, a discoloration occurs which varies from ivory to brown or gray, depending on the heating time and the amount of impurities (catalyst residue) contained in the polymers. It has also been observed that "browning" of the polymers increases with development of small amounts of hydrochloric acid. Another disadvantage is that if the proportion of catalyst residue present in the polymer is greater than 0.1%, the amount of hydrochloric acid evolved during the thermal treatment is sufficient to corrode the metal parts of the apparatus used for processing the polymers.

One object of this invention is to provide a method for preventing or inhibiting discoloration of the polymers on fusion thereof and even at very high working temperatures.

Another object is to prevent corrosion of metal parts of apparatus used in extruding or otherwise working the polymers during processing of the polymers at elevated temperatures.

These and other objects of the invention are accomplished by incorporating with the polymers, prior to fusing the same to a melt, certain heat-stable fixatives for hydrochloric acid which are compatible with these polymers.

We have found that particularly effective fixatives, useful in preventing or inhibiting discoloration of the polymers and corrosion of the apparatus are polymeric substances known in the art as epoxy resins.

Examples of suitable fixatives for use in the practice of this invention include resins obtained by condensing epichlorohydrin and diphenylol propane.

The amount of epoxy-containing stabilizer mixed with the polymeric olefinic-hydrocarbon may vary, depending on the proportion of impurities contained in the polymer to be processed. I find that, in general, when the ash content (deriving from the catalyst) of the polymer is between 0.01% and 1.0%, the stabilizer is effective to prevent the discoloration and corrosion when it is used in an amount of 0.1% to 1.0%. These values are given as illustrative and are not limiting, since both smaller and larger amounts of the stabilizer may be used.

The essential requirements for the fixative are that it must be compatible with the polymeric olefinic-hydrocarbon, stable at the temperature of working for the polymer, and have no adverse effect, such as a degrading effect, thereon. Use of the fixative is compatible with the use of antioxidants and light stabilizers of the kind conventionally used in processing the polymeric olefinic-hydrocarbons, as well as with the use of heat-stabilizers of other types.

The fixatives may be incorporated with the polymeric olefinic-hydrocarbons in any suitable way, as by mixing the fixative and polymer in powdered condition, in a roll mill at room temperature until a homogeneous blend of the two is obtained, usually a matter of a few minutes.

The epoxy-containing fixatives may be used alone or in admixture, in varying proportions, with lead salts of weak acids, such as basic lead phosphite.

The following examples are given to illustrate specific embodiments of the invention, it being understood that these examples are not intended as restrictive. In these examples, the polymeric olefin was obtained by polymerizing the monomer with the aid of catalysts as described hereinabove.

Example 1

About 200 g. of powdered polypropylene and 100 g. of powdered epichlorohydrin-diphenylolpropane resin were mixed in a roll mill at room temperature for 3–5 minutes. The mixture was then ground in a hammer mill. The resulting product had a grain size which appeared to be like that of the starting particles of the polypropylene due to the fact that the epoxy resin which had, initially, the appearance of a semi-solid viscous mass, was completely absorbed by the polypropylene during the mixing and grinding.

Six g. of the mixture obtained as described above were mixed in a rotating drum with 994 g. of polypropylene having an intrinsic viscosity of 2.0. The mass was extruded at 150–160° C. (temperature determined on the extruder). The color of the extruded article was compared with that of an article obtained by extruding the polypropylene at the same temperature, but without the addition of the epoxy resin. The polymer obtained from the mass containing the 0.2% of epoxy resin had a substantially white color, whereas the color of the article formed from the unmodified polypropylene was definitely gray.

*Example 2*

A ground mixture of polypropylene and the fixative was prepared as in Example 1, except that 50 g. of 2,2'-methylene-bis-4-methyl-6-tert. butylphenol was added as antioxidant.

7 g. of the resulting mixture were added to 993 g. of the polypropylene having intrinsic viscosity of 2.0, and the mass was extruded as in Example 1. The extruded article had a pale yellow color which was attributable to the presence of the particular antioxidant.

*Example 3*

A mixture of polyethylene (200 g.) and epichlorohydrin-diphenylolpropane resin (100 g.) was prepared as in Example 1.

6.0 g. of the concentrate thus obtained were mixed with 994 g. of polyethylene produced under a low pressure with the aid of the catalyst aforesaid and having a starting chlorine content of 0.16%. The mass was extruded as in Example 1, and the color of the extruded article was compared with that of an article obtained from the same polyethylene but without incorporation of the hydrochloric acid-fixative therewith.

In another run, 15 g. of the polyethylene-epoxy resin concentrate was mixed with 988 g. of the polyethylene and the color of the extruded article obtained under the same conditions was compared with that of the unmodified polyethylene article.

The color of the extruded products was as listed below.

Article from the low-pressure polyethylene containing 0.5% epoxy resin_____ Pale yellow.
Article from low pressure polyethylene containing 0.2% of the epoxy resin____ Brown-yellow.
Article from the low-pressure polyethylene not containing a fixative for the hydrochloric acid_____ Dark brown.

*Example 4*

One kg. of powdered isotactic polypropylene was mixed intimately with 3.0 g. basic lead phosphite. The mass was extruded and the color of the article obtained was compared with that of an article produced by extruding, under the same conditions, a similar polypropylene not containing the stabilizer. Articles formed from the mass comprising the polypropylene and fixative varied from ivory white to pale yellow, whereas the articles from the polypropylene not containing the phosphite or other fixative were yellow to brown in color, the darker shades being noted in the case of the articles formed from polypropylenes having, initially, the highest chlorine content.

*Example 5*

A mixture of polypropylene (200 g.) epichlorohydrin-diphenylolpropane resin (50 g.) and basic lead phosphite (50 g.) was prepared as described in Example 1.

6.0 g. of the mixture thus obtained were mixed in a rotating drum with 994 g. of polypropylene having an intrinsic viscosity of 2.0.

The mass was extruded in a hot extruder. The color of the extruded article was compared with that of a polypropylene basic lead phosphite article obtained as in Example 4.

The color of the extruded products was listed below.

Article from polypropylene containing 0.3% basic lead phosphite_____ Ivory white to pale yellow.
Article from polypropylene containing 0.2% of the epoxy resin-basic lead phosphite 1:1 mixture_____ Substantially white.

As will be apparent from the examples given, lead salts of weak acids may be used alone (without the epoxy-containing modifier) in some cases, to prevent discoloration of the polymeric olefinic hydrocarbon under heating.

Some changes and modifications may be made in specific details as given herein, in practicing this invention, without departing from the spirit and scope thereof. It is to be understood, therefore, that applicant intends to include in the scope of the appended claims all such modifications as may be apparent to those skilled in the art.

What is claimed is:

1. The method of preventing darkening of polymeric olefinic hydrocarbons which are solid at normal temperatures, and produced with the aid of catalysts prepared from halides of transition metals of Groups IV to VI inclusive of the Mendeleeff Periodic Table and organometallic compounds of elements of Groups I to III inclusive of said table, by residues of the catalysts present therein and which residues evolve hydrochloric acid when the polymers are heated to fusion temperature, and of preventing corrosion of the metal parts of apparatus in which the hot polymer is processed, which method comprises incorporating in the polymeric olefinic hydrocarbon, prior to heating the same to a temperature at which the acid is evolved, 0.1–1% by weight of a fixative for the hydrochloric acid which fixative is compatible with the polymer, stable at the temperature at which the polymer is processed, and selected from the group consisting of epichlorohydrin-diphenylolpropane resin, basic lead phosphite, and mixtures of the resin and phosphite.

2. A composition of matter comprising (1) a polymeric olefinic hydrocarbon which is solid at normal temperatures, and produced with the aid of a catalyst prepared from a halide of a transition metal of Groups IV to VI inclusive of the Mendeleeff Periodic Table and an organometallic compound of an element of Groups I to III inclusive of said table and containing residues of the catalyst which evolve hydrochloric acid when the polymer is heated to the fusion temperature therefor, and (2) for preventing discoloration of the polymer and corrosion of the metal parts of apparatus in which the polymer is processed under heating, by the evolved hydrochloric acid, 0.1–1% by weight of an epichlorohydrin-diphenylolpropane resin.

3. A composition of matter comprising (1) a polymeric olefinic hydrocarbon which is solid at normal temperatures, and produced with the aid of a catalyst prepared from a halide of a transition metal of Groups IV to VI inclusive of the Mendelleeff Periodic Table and an organometallic compound of an element of Groups I to III inclusive of said table, and containing residues of the catalyst which evolve hydrochloric acid when the polymer is heated to the fusion temperature therefor, and (2) for preventing discoloration of the polymer and corrosion of the metal parts of apparatus in which the polymer is processed under heating, by the evolved hydrochloric acid, 0.1–1.0% by weight of a fixative for the hydrochloric acid which is compatible with the polymer, stable at the fusion temperature for the polymer, has no harmful effect on the polymer when heated therewith, and which is selected from the group consisting of epichlorohydrin-diphenylolpropane resin, basic lead phosphite, and mixtures of the resin and phosphite.

4. The method according to claim 1 characterized in that the hydrochloric acid fixative is incorporated in the polymeric olefinic hydrocarbon by rolling and milling the two materials together at room temperature.

5. The method according to claim 1 characterized in that when the ash content of the polymeric olefinic hydrocarbon is between 0.01% and 1%, the amount of the hydrochloric acid fixative incorporated in the polymer is 0.1% to 1.0% by weight based on the polymer weight.

6. The method according to claim 1 characterized in that the fixative is an epichlorohydrin-diphenylolpropane resin.

References Cited in the file of this patent

UNITED STATES PATENTS

| | | |
|---|---|---|
| 2,564,194 | De Nie et al. | Aug. 14, 1951 |
| 2,604,464 | Segall et al. | July 22, 1952 |
| 2,826,562 | Shokal | Mar. 11, 1958 |
| 2,882,263 | Natta et al. | Apr. 14, 1959 |
| 2,927,047 | Schülde et al. | Mar. 1, 1960 |

OTHER REFERENCES

Modern Plastics Encyclopedia Issue (1955) (p. 105 relied upon).